(12) United States Patent
Li

(10) Patent No.: US 11,449,448 B2
(45) Date of Patent: Sep. 20, 2022

(54) DEVICE AND METHOD FOR CONTROLLING A TRANSFER OF INFORMATION FROM A PLURALITY OF ELECTRONIC COMPONENTS THROUGH A COMMUNICATION BUS TO A HOST DEVICE

(71) Applicant: INIVATION AG, Zürich (CH)

(72) Inventor: Chenghan Li, Zürich (CH)

(73) Assignee: INIVATION AG, Zurich (CH)

( * ) Notice: Subject to any disclaimer, the term of this patent is extended or adjusted under 35 U.S.C. 154(b) by 77 days.

(21) Appl. No.: 17/051,100

(22) PCT Filed: Apr. 15, 2019

(86) PCT No.: PCT/EP2019/059706
§ 371 (c)(1),
(2) Date: Oct. 27, 2020

(87) PCT Pub. No.: WO2019/206724
PCT Pub. Date: Oct. 31, 2019

(65) Prior Publication Data
US 2021/0232519 A1  Jul. 29, 2021

(30) Foreign Application Priority Data
Apr. 27, 2018 (EP) .................. 18169882

(51) Int. Cl.
*G06F 3/00* (2006.01)
*G06F 13/362* (2006.01)
*G06F 1/10* (2006.01)

(52) U.S. Cl.
CPC ............ *G06F 13/3625* (2013.01); *G06F 1/10* (2013.01)

(58) Field of Classification Search
CPC ......... G06F 13/00; G06F 13/3625; G06F 1/10
See application file for complete search history.

(56) References Cited

U.S. PATENT DOCUMENTS 4,458,357 A * 7/1984 Weymouth .......... G06F 12/0676
377/2
5,051,985 A * 9/1991 Cidon ................... H04L 12/433
370/452

(Continued)

FOREIGN PATENT DOCUMENTS

| JP | 2015-015608 A | 1/2015 |
| JP | 2017-085549 A | 5/2017 |
| WO | WO 2015/036592 A1 | 3/2015 |

*Primary Examiner* — Henry Tsai
*Assistant Examiner* — Kim T Huynh
(74) *Attorney, Agent, or Firm* — Christensen, Fonder, Dardi & Herbert PLLC

(57) ABSTRACT

A device for controlling a transfer of information from a plurality of electronic components through a communication bus to a host device, comprising a chain of processing blocks connected to the electronic components, each of the processing blocks associated with one, or a set, of the electronic components, which processing blocks are arranged such that during the transfer of information an authorization signal propagates through the chain of processing blocks and, when the authorization signal encounters a processing block associated with one of the electronic components or one of the sets of electronic components which contains an information value to be transferred, effecting the transfer of the information value through the communication bus to the host device. The processing blocks are arranged to coordinate their processing in accordance with a clock signal generated independent of a propagation status of the authorization signal within the chain of processing blocks.

11 Claims, 6 Drawing Sheets

(56) References Cited

U.S. PATENT DOCUMENTS

| | | | |
|---|---|---|---|
| 5,404,556 A | 4/1995 | Mahowald et al. | |
| 7,843,503 B2* | 11/2010 | Ruedi | H04N 5/341 |
| | | | 348/302 |
| 10,097,779 B2 | 10/2018 | Park | |
| 2006/0256099 A1* | 11/2006 | Tashiro | G09G 3/2092 |
| | | | 345/204 |
| 2007/0296464 A1* | 12/2007 | Lewko | G06F 1/10 |
| | | | 326/93 |
| 2011/0153888 A1* | 6/2011 | Sun | G06F 13/4256 |
| | | | 710/313 |
| 2014/0125994 A1 | 5/2014 | Kim et al. | |
| 2015/0009381 A1 | 1/2015 | Araoka | |
| 2015/0193373 A1* | 7/2015 | Ngo | G06F 13/4018 |
| | | | 710/110 |

\* cited by examiner

DEVICE AND METHOD FOR CONTROLLING A TRANSFER OF INFORMATION FROM A PLURALITY OF ELECTRONIC COMPONENTS THROUGH A COMMUNICATION BUS TO A HOST DEVICE

RELATED APPLICATIONS

The present application is a National Phase entry of PCT Application No. PCT/EP2019/056706, filed Apr. 15, 2019, which claims priority to European Patent Application No. 18169882.0, filed Apr. 27, 2018, the disclosures of which are hereby incorporated by reference herein in their entirety.

FIELD OF THE INVENTION

The invention relates to a device and a method for controlling a transfer of information from a plurality of electronic components through a communication bus to a host device.

BACKGROUND OF THE INVENTION

A number of such devices and methods have been proposed before, which rely on time-multiplexing of the shared communication bus. The idea is to allow each electronic component to access the shared communication bus during a time slot in order to transfer its information to the host device. The electronic component can be related to a pixel of an optical sensor. It might contain the raw data from the sensor as information, or the information may have been pre-processed in order to obtain the information that is contained in the electronic component. In order to improve the read-out speed, it is known to only grant access to those of the electronic components, which do indeed contain information to be sent to a host.

A known system described in U.S. Pat. No. 5,404,556 reads information from a plurality of electronic components through a time-multiplexed shared communication bus, which does not give bus access to electronic components that have no information. However, the said time-multiplexing of the shared communication bus is arbitrated by a binary decision tree through an asynchronous handshake protocol with the receiving host. Therefore, the information is read in a non-systematic sequence. Such a system cannot ensure that all the electronic components that have information are serviced within a determined time. A faulty electronic component that constantly requests bus access time may compromise the shared communication bus. Moreover, when such a system is communicating with a synchronous receiving host, the asynchronous handshake protocol needs to be synchronized, which incurs additional delay.

To ensure fair bus access even when a faulty electronic component exists, U.S. Pat. No. 7,843,503 proposes a system that reads information from a plurality of electronic components through a clock-multiplexed shared communication bus, which also skips electronic components that have no information. The multiplexing is clocked, hence the information is read systematically and sequentially. Despite this, when the readout is performed by a synchronous receiving host, an additional synchronization step is needed to synchronize the bus multiplexing clock with the receiving host clock. The additional synchronization step incurs additional host clock periods at each multiplexing of the communication bus, which drastically slows down the read speed at a given host clock frequency.

SUMMARY

It is an objective of the present invention to suggest a device and a method for controlling a transfer of information from a plurality of electronic components through a communication bus to a host device, with a higher read speed at a given host clock frequency.

This objective is met according to the present invention by providing various devices and methods as described in the claims.

In one aspect of the invention, a device is suggested for controlling a transfer of information from a plurality of electronic components through a communication bus to a host device. The device comprises a chain of processing blocks connected to the plurality of electronic components, whereby each of the processing blocks is associated with one of the plurality of electronic components or with a set of electronic components of the plurality of electronic components. The processing blocks are arranged such that during the course of the transfer of information an authorization signal propagates through the chain of processing blocks and, when the authorization signal encounters a processing block associated with one of the electronic components or one of the sets of electronic components which contains an information value to be transferred, effecting the transfer of the information value through the communication bus to the host device. Furthermore, the processing blocks are arranged to coordinate their processing in accordance with a clock signal generated independent of a propagation status of the authorization signal within the chain of processing blocks.

In contrast, when looking at the prior art document, U.S. Pat. No. 7,843,503, the multiplexing clock is self-determined by a signal j_ready that indicates whether a bus access token has stopped at an electronic component that contains information. Because the propagation time of the bus access token from the current electronic component to the next depends on the number of electronic components being skipped by the bus access token, the signal j_ready, and hence the bus multiplexing clock, does not switch at fixed and known time intervals. Therefore, in order to communicate to a synchronous receiving host, an additional synchronization step is needed to synchronize the signal j_ready, and hence the bus multiplexing clock, with the receiving host clock. Such an additional synchronization step would incur additional host clock periods at each multiplexing of the communication bus, which would drastically slow down the read speed at a given host clock frequency. As an example, the maximum possible read speed is halved if 1 additional host clock period is used to synchronized the signal j_ready, i.e. the maximum possible read speed is 1 electronic component read per 2 host clock periods.

The invention is based on the idea of designing the device in such a way that the chain of processing blocks can be clocked with an independent clock signal, which is not dependent on a propagation status of the authorization signal within the chain of processing blocks. By allowing for an independent clock signal, the synchronization step necessary for synchronizing the readout of the information with the host device is practically performed already within the processing blocks at the device side. The need for a further synchronization step can therefore be eliminated.

That the clock signal is generated independent of a propagation status of the authorization signal within the chain of processing blocks means in particular that the clock signal could, in some embodiments, still depend on whether the authorization signal has reached an end of the chain of processing blocks. However, while the authorization signal is within the chain of processing blocks, in particular still away from the end of the chain of processing blocks, the clock signal is generated independent of a propagation status of the authorization signal. In other words, the clock signal is not dependent on where the authorization signal is along the chain of processing blocks. In particular, the clock signal is not extracted from a trigger signal generated at any of the processing blocks in the chain of the processing blocks.

Such an independent clock signal may in particular be generated by a clock, which is independent of the device according to the invention, or at least independent of the chain of processing blocks. Advantageously, the clock signal is generated at and/or received from the host device. In this embodiment, the multiplexed communication between the electronic components and the host device is host-clocked. The multiplexing clock is thus determined by the receiving host device. Hence, not only the information is read systematically and sequentially, but also, no additional synchronization step is needed between the device and a synchronous receiving host device.

Preferably, the clock signal is regular, i.e. with regular clock cycles that do not change in time apart from unavoidable random fluctuations.

According to an advantageous embodiment, the processing blocks are arranged such that the authorization signal is propagated through the processing block associated with one of the electronic components or one of the sets of electronic components, which contains an information value to be transferred, coordinated by the clock signal received from the host device. In other words, the clock signal coordinates the propagation of the authorization signal through the processing block associated with (an) information carrying electronic component(s). In this case, propagation of the authorization signal through processing blocks, which are not associated with information carrying electronic component(s), may be not coordinated by the clock signal, and may even be travelling freely.

Advantageously, the processing blocks are arranged such that the authorization signal is propagated through at most one processing block associated with one of the electronic components, which contains an information value to be transferred, for each clock cycle or clock period of the clock signal. In this case, each clock cycle of the clock signal leads either to exactly one information value being read from one electronic component or to no readout at all. The latter situation may arise when the authorization signal has to propagate through so many processing blocks associated with electronic components having no information value before reaching a processing block associated with an information carrying electronic component, that the time passed equals at least the time from one clock cycle to the next.

Advantageously, the authorization signal is a switching edge signal. It may in particular be a rising edge signal or a falling edge signal, i.e. either a switch of the signal carrying outlet from a low value to a high value or from a high value to a low value. Such a switching edge signal has the two advantages: First, it is possible for a processing block to register whether the authorization signal has passed or not. This could be useful, if the system does clock gating, to stop clocking the processing blocks which the authorization signal has already passed. Second, every switching edge is a source of a potential metastable condition. If the authorization signal is a pulse signal, it consists of a rising edge, followed by a falling edge. In this case, it would be much more difficult (if possible at all) to design the processing block to correctly detect the authorization signal when a metastable condition arises. Thus, designating the authorization signal as a switching edge signal can allows for a more reliable detection of the authorization signal.

According to some advantageous embodiments, each processing block comprises a service path and a skip path for the authorization signal to selectively propagate along. In other words, in order to pass through each processing block, the authorization signal takes either the skip path or the service path of that processing block. If the electronic components or one of the sets of electronic components associated with the processing block contains an information value to be transferred, the authorization signal propagates by way of the service path of that processing block. Otherwise, it propagates by way of the skip path of that processing block.

Advantageously, the skip path is designed such that the authorization signal propagates through much faster than through the service path, for example at least 10 times, 50 times, 100 times, 500 times, or 1000 times faster. As an example, if the clock frequency is in the range of 10 s of MHz to 100 s of MHz, the propagation delay for the authorization signal through one processing block along the service path could be from a few ns to 10 s of ns, while the propagation delay for the authorization signal through one processing block along the skip path is typically in the range of 0.05 ns to 0.1 ns.

Preferably, each processing block comprises in its service path a flip-flop, through which the authorization signal can propagate. In particular, the service path may contain a D-flip-flop (DFF). The chain of processing blocks comprises then a chain of DFFs.

Advantageously, each processing block may comprise in its service path a further flip-flop, in particular a D-flip-flop, connected in series with and arranged to capture an output value of the flip-flop as a reference value for detecting the authorization signal. The further flip-flop (in the following discussion called a Past flip-flop, or a Past DFF) thus saves a past value at the output of the flip-flop (in the following discussion called a Present flip-flop, or a Present DFF). The outputs of the Present flip-flop (Present Input to switching edge detector) and the Past flip-flop (Past Input to switching edge detector) can then be compared, for example with an AND gate with one negated input, in order to detect the authorization signal, in particular as a switching edge signal. Such a setup is in the following designated as a switching edge detector, in particular a rising edge detector or a falling edge detector.

In preferred embodiments, each of the processing blocks comprises one or multiple pairs of complementary transistors. The processing blocks may in particular be made in complementary metal-oxide-semiconductor (CMOS) technology. In CMOS technology, complementary pairs of p-type and n-type metal oxide semiconductor field effect transistors (MOSFETs) are used for logic functions. In a typical embodiment, the two transistors in the complementary pair may be symmetrical, in particular have the same or substantially the same threshold voltage. Substantially the same may mean that a process-related or application-related threshold discrepancy may exist, wherein for example the n-type transistor has a slightly lower threshold than the p-type transistor. In case of a realization in CMOS, this is regularly referred to as complementary-symmetry metal-oxide-semiconductor (or COS-MOS).

According to an improved embodiment of the device, in at least one of the pairs of complementary transistors, one of the transistors has a different threshold or threshold voltage than the other of the transistors. In particular, such asymmetrical threshold transistor pairs may be utilized in the circuits designed for detecting the authorization signal. Such asymmetrical threshold transistor pairs may be included in the skip path and/or in the service path of each processing block.

Such asymmetrical threshold transistor pairs may advantageously be utilized in order to prevent device failures due to a metastable condition. Such a metastable condition failure may arise for example when a processing block associated with an electronic element containing information is skipped (omission failure), or for example when two processing blocks, each associated with an electronic element containing information, are serviced at the same time (collision failure). These possible failure states are described in more detail in connection with the example embodiments further below.

Advantageously, when the service path contains a Present flip-flop, a Past flip-flop, and a switching signal detector, the Present Input to the switching signal detector may have a lower switching threshold than the input to the Past flip-flop, in order to avoid an omission failure. In further advantageous embodiments, when the service path contains a Present flip-flop and a Past flip-flop, the input to the Present flip-flop and to the skip path may have a higher switching threshold than the input to the Past flip-flop, in order to prevent a collision failure.

It should be noted that herein a "switching threshold" refers to a threshold of an input to a complementary switching element pair that needs to be surpassed in order to allow the input signal to be registered and passed through as such by the circuit. Advantageously, this switching threshold is an unsigned, absolute value. For a rising edge authorization signal, the switching threshold is measured from the logical "0" value (e.g. at 0 Volts), while for a falling edge authorization signal, the switching threshold of the "upside down" circuit should be measured from the logical "1" (e.g. at 1.2 Volts). In the case of the "upside down" circuit, "higher switching threshold" means that the signal value at which a switching signal is detected is closer to 0. In contrast, a "threshold" or "voltage threshold" refers to an activation voltage of a single transistor in the transistor pair. In a transistor, in particular as part of a CMOS transistor pair, the threshold or voltage threshold may refer to a minimum gate voltage VG or gate-to-source voltage VGS that is needed to create a conducting path between the source and drain terminals.

To reiterate, the switching threshold of the circuit refers to a threshold of an input to a complementary switching element pair that needs to be crossed in order to allow the input signal to change the (on/off) state of the complementary switching element pair and the subsequent circuit output.

In the case when the authorization signal is a rising edge signal, the switching threshold of the circuits in the processing block refers to a threshold voltage of the input signal measured from logic low or zero (0) level, which an input signal originally received by the circuits as 0 needs to rise above in order to allow the input signal to be detected by the circuits as a logic high or one (1) value. A higher switching threshold in this case means that the threshold voltage is further away from 0 and closer to 1, and vice versa. For example, for a circuit with 0V as logic low or 0 level, 1.2V as logic high or 1 level, a standard switching threshold could be about 0.6V, a high switching threshold could be about 0.8~0.9V, a low switching threshold could be about 0.3~0.4V. The bigger the margin between the standard, high, and low switching thresholds, the less likely the design could be compromised by CMOS fabrication process variations.

In the case when the authorization signal is a falling edge signal, the switching threshold of the circuits in the processing block refers to a threshold voltage of the input signal measured from logic low or 1 level, which an input signal originally received by the circuits as 1 needs to fall below in order to allow the input signal to be detected by the circuits as 0. A higher switching threshold in this case means the threshold voltage is further away from 1 and closer to 0, and vice versa. For example, for a circuit with 0V as logic low or 0 level, 1.2V as logic high or 1 level, a standard switching threshold could be about 0.6V, a high switching threshold could be about 0.3~0.4V, a low switching threshold could be about 0.8~0.9V. The bigger the margin between the standard, high, and low switching thresholds, the less likely the design could be compromised by CMOS fabrication process variations.

For avoiding an omission failure and/or a collision failure, at least one processing block may comprise a circuit portion having a low switching threshold and a further circuit portion having a high switching threshold. In particular, when the processing block contains a service path having a flip-flop circuit and a further flip-flop circuit connected in series to the output of the flip-flop circuit, it is advantageous if the Present flip-flop circuit has a higher switching threshold than the Past flip-flop circuit. In addition, when the processing block comprises a switching edge detector, the input to the switching edge detector stemming from the output of the Past flip-flop circuit (past input) may have a different switching threshold than the input to the switching edge detector stemming from the output of the flip-flop circuit (present input).

In particular, in an advantageous embodiment, when the processing block comprises a switching edge detector, the present input to the switching edge detector should have a lower switching threshold than the input to the Past flip-flop circuit, which again may have a smaller switching threshold than the input to the Present flip-flop and the skip path. The switching threshold of the past input to the edge detector can be equal to or higher or lower than the present input to the edge detector.

Alternatively or cumulatively, if the processing block has a skip path circuit and a service path circuit, the input to the skip path circuit may preferably have the same switching threshold as the input to the service path circuit.

In an embodiment where multiple sets of electronic components are to be read out by the device, the electronic components may be arranged in a two-dimensional array. In this case, a first chain of processing blocks, each associated with a column of electronic components of the plurality of electronic components and a second chain of processing blocks, each associated with a row of electronic components of the plurality of electronic components, may be provided. In this case, the first and second chains of processing blocks are arranged such that the authorization signal is propagated through the second chain of processing blocks from the processing block associated with a row of electronic components to the processing block associated with a (immediately) following or consecutive row of electronic components, and for each row of electronic components (or for each row of electronic components that contain information), the authorization signal is propagated through the first chain of processing blocks from the processing block associated with a column of electronic components to the processing block associated with a (immediately) following or consecutive column of electronic components. For each row that has no information (indicated by the shared req signal, see below), the whole row is skipped without going through the second chain of processing blocks.

Advantageously, effecting the transfer of the information value through the communication bus to the host device is performed by giving access of the communication bus to the electronic component, which contains the information value, and sending an identifier of the electronic component, which contains the information value, to the host. The identifier of the electronic component may in particular contain a row identifier or y identifier and a column identifier or an x identifier when the electronic components are arranged in a two-dimensional array. The identifier may be determined by an encoder circuit.

In a further aspect of the invention, a method for controlling a transfer of information from a plurality of electronic components through a communication bus to a host device is provided. This method is performed on a chain of processing blocks, each associated with one of the plurality of electronic components or with a set of electronic components of the plurality of electronic components. By performing the method, during the course of the transfer of information an authorization signal propagates through the chain of processing blocks and, when the authorization signal encounters a processing block associated with one of the electronic components or one of the sets of electronic components which contains an information value to be transferred, the information value is transferred through the communication bus to the host device, wherein processing of the processing blocks is coordinated in accordance with a clock signal received from the host device. Any feature described herein with respect to the device is also applicable accordingly to the method.

BRIEF DESCRIPTION OF THE DRAWINGS

Some examples of embodiments of the present invention will be explained in more detail in the following description with reference to the accompanying schematic drawings, wherein.

DETAILED DESCRIPTION

In the embodiments of the invention described in the following, the electronic components from which information is to be read are arranged (either spatially or logically) in a two-dimensional array. Each electronic component might be a photodiode representing a pixel of an optical sensor, or it might be an element in a storage device of a signal processor, representing a pixel of an optical sensor which has been processed. The information value contained in each electronic component may be a bit, a byte or any other piece of information, such as an analog value. If it relates to an optical sensor, the information value may be an indicator for a change in the optical quantity by the sensor at the corresponding pixel. While the following embodiments concern a two-dimensional array of electronic components, a similar approach may be implemented for reading information from a one-dimensional array of electronic components. In this case, instead of two chains of processing blocks as described below, there is only the need for one chain of processing blocks.

Figure 1:
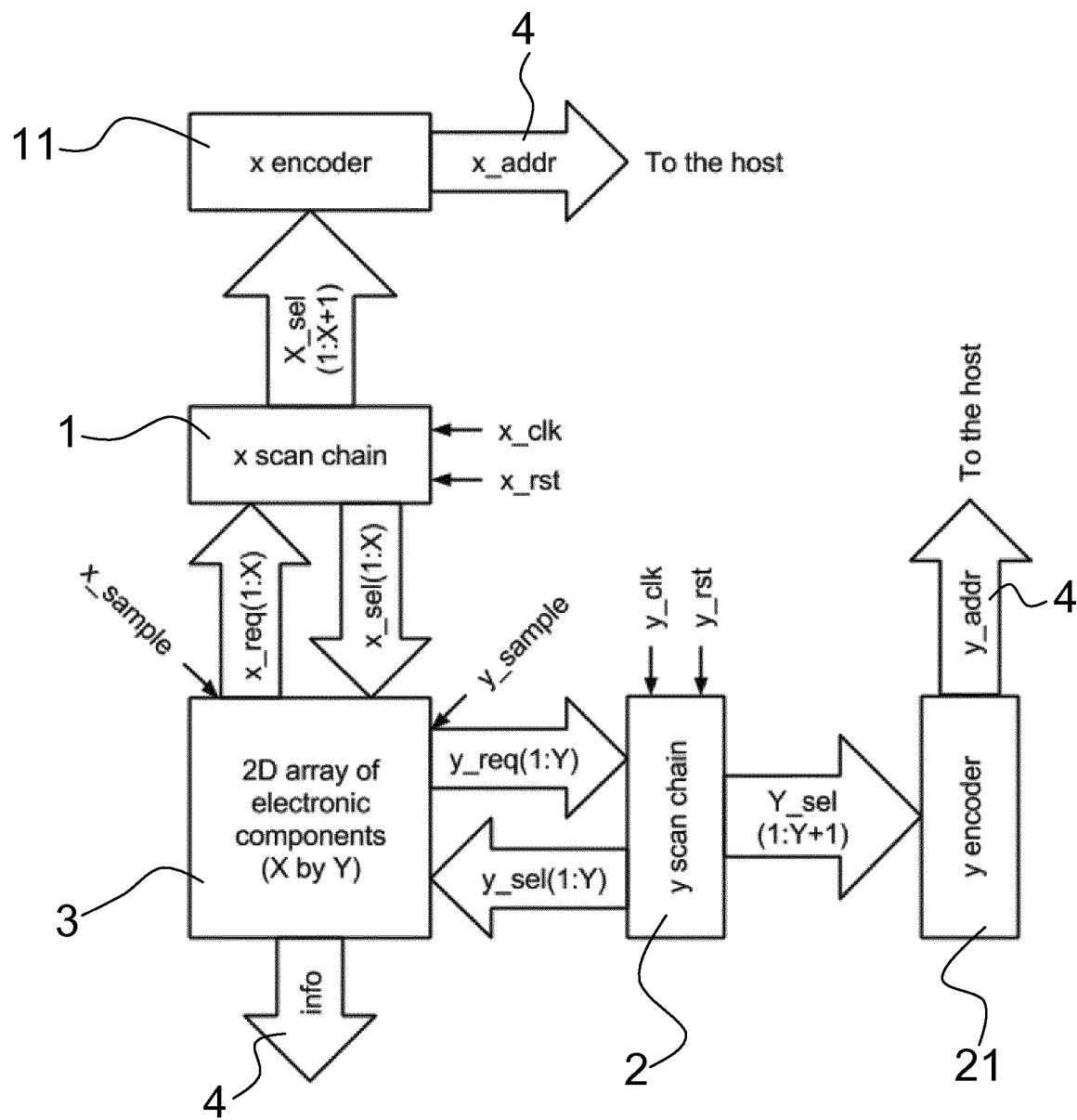
FIG. 1 shows a schematic diagram of components of a device for controlling a transfer of information from a plurality of electronic components through a communication bus to a host device.

FIG. 1 shows a two-dimensional (2D) array 3 of electronic components, which is connected to a communication bus 4, on or through which information from each electronic component can be sent to a host (not shown in the figures) in a time-multiplexed fashion. The communication bus 4 is also connected to a column encoder (in the following: x encoder), which supplies the host with a column indicator (x_addr), and a row encoder (in the following: y encoder), which supplies the host with a row indicator (y_addr). x_addr and y_addr specify the specific electronic component which at a given time has gained access to the communication bus 4 for sending its information value to the host. Both the column and the row encoder can also be connected to the host device through the communication bus 4, in order to submit x_addr and y_addr through the communication bus 4 to the host device.

In order to control the readout of the 2D array 3 of electronic components, a first chain 1 of processing blocks, each associated with a column of the array 3 and a second chain 2 of processing blocks, each associated with a row of the array 3, are provided. Thus, the first chain 1 is designated to multiplex the bus access time among the columns of the array 3, and the second chain 2 to multiplex among the rows of the array 3.

In addition to the communication bus 4, which can be viewed as a combination of three busses, namely info, x_addr, and y_addr, any set of signal lines can be combined into a bus. In particular, select and request signals for each row and/or each column can be combined into separate busses. For example, in the following, reference is made to a x_req(1:X) bus, comprises X signal lines of the request signals leading to the first chain 1 of processing blocks to the 2D array 3.

The array 3 contains Y rows by X columns of electronic components. For any row j, j∈[1:Y], a row request signal y_req(j) and a row select signal y_sel(j) are shared by all the electronic components in this row. If there is any electronic component in row j that has information, then y_req(j)=1. If none of the electronic components in row j has information, then y_req(j)=0. A y_req(1:Y) bus, i.e. a bus with Y signal lines carrying the values y_req(1) to y_req(Y), is updated by a host generated signal y_sample. For any column i, i∈[1:X], a column request signal x_req(i) and a column select signal x_sel(i) are shared by all the electronic components in this column. A x_req(1:X) bus, i.e. a bus with X signal lines carrying the values x_req(1) to x_req(X), can only be accessed by 1 row at most at any moment. If y_sel(j)=1, then the electronic components on row j have access to the x_req(1:X) bus. And while y_sel(j)=1, if the electronic component (i,j) has information, then x_req(i)=1. The x_req (1:X) bus is updated by the signal x_sample (derived from a host generated row clock signal y_clk).

The first chain 1 of processing blocks has X+1 processing blocks, where the first X processing blocks receive x_req(1:X). The end processing block has the signal x_req(X+1) hardwired to 1, so that the end segment is never skipped. This is explained further below. Similarly, the second chain 2 of processing blocks has Y+1 processing blocks, where the first Y processing blocks receive y_req(1:Y), and the end processing block has y_req(Y+1) hardwired to 1.

The first chain 1 produces column select signals x_sel(1:X+1), which control the x encoder to determine which column address to send to the host through the x_addr bus, or the x_addr portion of the communication bus 4. The second chain 2 produces row select signals y_sel(1:Y+1), which control the y encoder to determine which row address to send to the host through the y_addr bus, or the y_addr portion of the communication bus 4. The signals x_sel(1:X) and y_sel(1:Y) together determine which electronic component in the 2D array 3 has access to the shared info bus, or the portion of the communication bus 4 carrying the information read from the 2D array 3. For example, if x_sel(i)=1 and y_sel(j)=1, then the x encoder will send the column i address through the x_addr bus, the y encoder will send the row j address though the y_addr bus, and the electronic component (i, j) gains access to the shared info bus to send its information to the host. The x_addr bus and the info bus are both updated by a host generated column clock signal x_clk. The y_addr bus is updated by the host generated row clock signal y_clk. When each or all of the x_addr bus, the y_addr bus, and the info bus are not being accessed, they are each reset to a unique empty value so that the host can differentiate between an empty value and a valid value.

Furthermore, a column sample signal x_sample and a row sample signal y_sample are also generated by the host device and control the readout from the 2D array 3. In summary, the entire system, and therefore the readout of information from the 2D array 3 through the communication bus 4, is controlled by the signals x_clk, x_rst, y_clk, y_rst, y_sample from the host. The signal x_sample is derived from and in the present case identical to y_clk.

Figure 2:
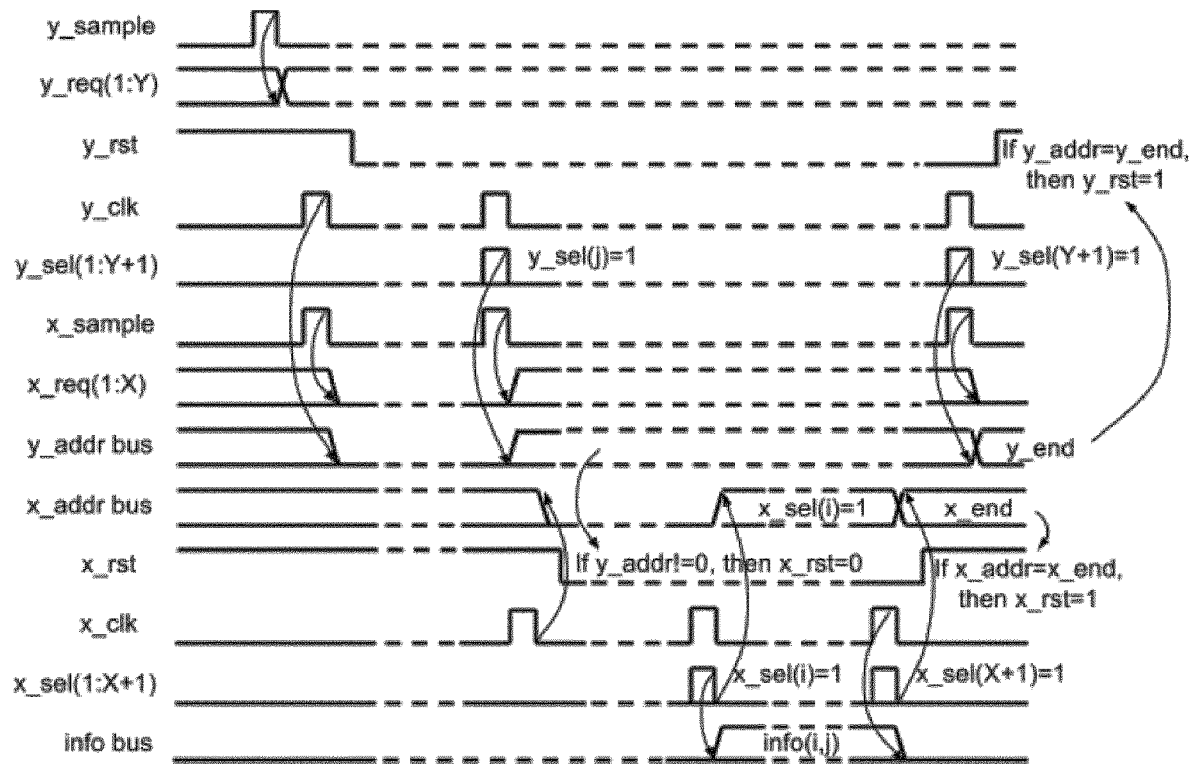
FIG. 2 shows a timing diagram of the system shown in FIG. 1.

FIG. 2 shows a timing diagram of the system depicted in FIG. 1. To initiate the scan process of the 2D array 3, a y_sample pulse makes the y_req(1:Y) bus update its values. While the row reset signal y_rst is still 1, a pulse in y_clk resets the second chain 2. The derived x_sample also has 1 pulse, which makes the x_req(1:X) bus update its values. In this case, the second chain 2 is still in reset, none of the y_sel(1:Y) is 1, which means that no row has access to the x_req(1:X) bus, and hence x_req(1:X)=0. Also, because no row has access to the y encoder, the y_addr bus is reset to its empty value following the y_clk pulse, in this case y_addr=0.

After the row reset signal y_rst switches to 0, the second chain 2 starts scanning by propagating a rising edge signal from the beginning of the second chain 2 through the second chain 2. Suppose row j has y_req(j)=1. When the rising edge signal is detected by the segment j, i.e. by the processing block of the second chain 2 associated with row j, which is short for row j of electronic components of the 2D array 3, the segment j sets the row select signal of row j equal to 1, i.e. y_sel(j)=1, clocked by the row clock signal y_clk. This effects the y encoder to send the address of row j through the y_addr bus to the host. At the same time, because y_sel(j)=1 gives row j access to the x_req(1:X) bus, the x_req(1:X) bus takes the values from row j following a x_sample (y_clk) pulse.

While the column reset signal x_rst is still 1, a pulse in the column clock signal x_clk resets the first chain 1—this will be explained further below. And because no column has access to the x encoder, the x_addr bus is reset to its empty value following the column clock signal x_clk pulse, in this case x_addr=0.

Once the host device receives a valid, i.e. in particular non-empty, row address y_addr value, the host sets the column reset signal x_rst to 0, the first chain 1 starts scanning by propagating a rising edge signal, starting at the beginning of and propagating through the first chain 1. Suppose column i has x_req(i)=1, when the rising edge signal is detected by the segment i, the segment i sets x_sel(i)=1 (clocked by x_clk), which effects the x encoder to send the address of column i through the x_addr bus to the host following the x_clk pulse. At the same time, because y_sel(j)=1 and x_sel(i)=1, the electronic component (i,j) gains access to the info bus to send its information to the host device following the x_clk pulse.

When the rising edge signal propagating along the first chain 1 reaches the end of the first chain 1, the last processing block or end processing block with the number X+1 sets x_sel(X+1)=1 (clocked by x_clk). Hence the x encoder sends an end address x_end through the x_addr bus to the host device following the x_clk pulse. Meanwhile, because x_sel(1:X)=0, no electronic component from the 2D array 3 can access the info bus, the info bus is reset to all 0 following the x_clk pulse. Once the host receives x_end, the host sets x_rst=1, and proceeds to generate a row clock y_clk pulse.

When the rising edge signal propagating along the second chain 2 reaches the end of the second chain 2, the end processing block with the number Y+1 sets y_sel(Y+1)=1 (clocked by y_clk). Hence the y encoder sends its end address y_end through the y_addr bus to the host device following the y_clk pulse. Once the host device receives y_end, the host device sets y_rst=1, which signals that the system has completed scanning the entire 2D array 3 of electronic components once and that all electronic components that contained information to be read have been serviced accordingly. The 2D scanning process described above can then be repeated from the beginning.

Figure 3:
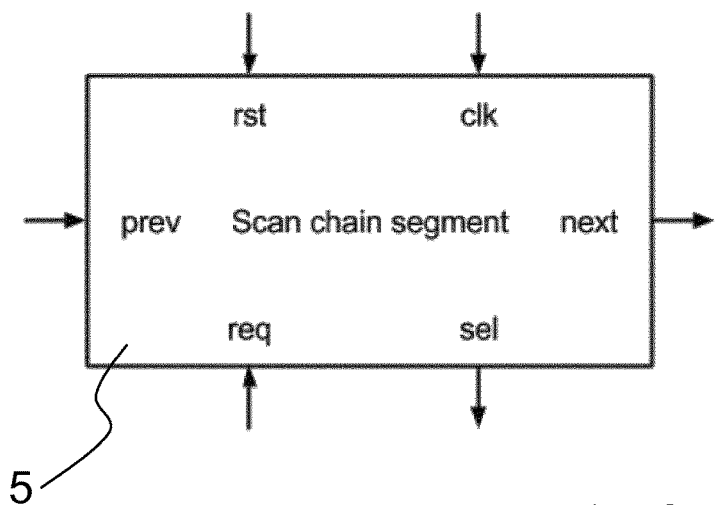
FIG. 3 shows an abstract depiction of a processing block employed in the system of FIG. 1.

FIG. 3 illustrates an abstract view of a processing block, i.e. a segment of the first chain 1 or the second chain 2 employed in the system of FIG. 1. The switching edge signal that propagates along the respective chain 1, 2 enters the processing block as a "previous" signal prev, and exits as the "next" signal next. Each processing block receives a request signal req from a row or column of electronic components of the 2D array 3, and sends a select signal sel to that row or column. Each processing block is controlled by the signals reset rst and clock clk, which are generated by the host device, i.e. host-generated.

Each processing block contains two path choices to propagate the switching edge signal: If the corresponding row/column has information (req=1), i.e. if at least one electronic component in the row/column of the 2D array 3 associated with the processing block contains information to be read, the rising edge propagates through a clocked service path. If, in contrast, the corresponding row/column has no information (req=0), the rising edge propagates through an un-clocked skip path.

Figure 4:
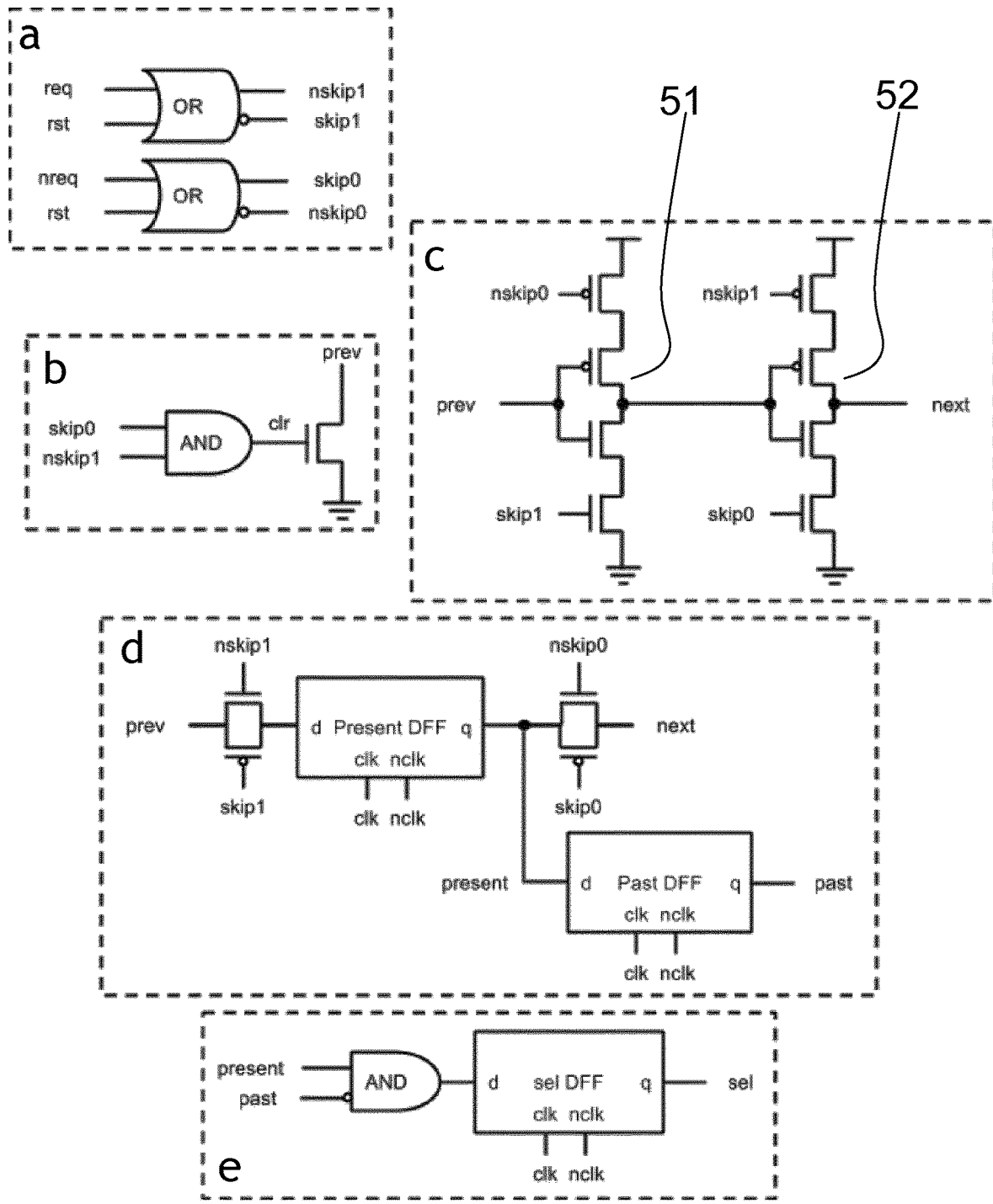
FIG. 4 shows internal details of the processing block of FIG. 3 according to one embodiment.

FIG. 4 shows the internal details of a processing block, in particular, with a rising edge signal as the authorization signal. Each processing block comprises a path logic circuit (shown in FIG. 4*a*), a reset logic circuit (shown in FIG. 4*b*), a skip path circuit (shown in FIG. 4*c*) and a service path circuit (shown in FIG. 4d). Furthermore, the processing block comprises a rising edge detector, which is shown in FIG. 4e. Herein, an inverted request signal nreq is an inverted signal from the request signal req and an inverted clock signal nclk is an inverted signal from the clock signal clk. req=1 and nreq=0 means that the corresponding row/column has information, vice versa, req=0 and nreq=1 means that the corresponding row/column has no information. The path logic circuit transforms these inputs and generates therefrom logic inputs for controlling the service and skip path circuits.

The skip path circuit comprises a first relay 51 and a second relay 52, which the rising edge signal coming from the input prev has to pass through to arrive at the output next of the processing block when travelling through the skip path. The service path, on the other hand, comprises a first flip-flop, namely a D-flip-flop designated as "present DFF" in FIG. 4d, and a second flip-flop, designated "past DFF" in FIG. 4d. It takes generally one clock cycle for the rising edge signal to pass through the processing block, when going through the service path, while it takes a fraction of such a cycle for it to pass through the processing block, when going through the skip path. As an example, when the clock signal is such that a clock cycle has a duration of 10 ns, the rising edge signal might be able to pass through within a clock cycle around 200 processing blocks when none of them are associated with information carrying rows/columns of the 2D array 3, and thus the rising edge signal travels only through their skip paths.

After a processing block is reset, prev=0 and present=0. The circuits function as follows:
When rst=0:
  If req=1 and nreq=0, the path logic sets skip0=0, nskip0=1, skip1=0, nskip1=1. Hence both skip path relays 51, 52 are disabled, the signal prev is connected to the input of the present DFF, and the output of the present DFF is connected to the signal next. The rising edge signal propagates through the clocked service path: Suppose at time t the rising edge signal arrives at the output of the present DFF, present=1 and past=0, hence a rising edge is detected, then at time t+1, the rising edge detector sets sel=1 to service the corresponding row/column.
  If req=0 and nreq=1, the path logic sets skip0=1, nskip0=0, skip1=1, nskip1=0, hence both skip path relays 51, 52 are enabled, the signal prev is disconnected from the input of the present DFF, and the output of the present DFF is disconnected from the signal next. The rising edge signal propagates through the un-clocked skip path.
When rst=1, regardless of the value of req and nreq, the path logic sets skip1=0, nskip1=1, skip0=1, nskip0=0, hence the first skip path relay 51 becomes pull-up only, the second skip path relay 52 becomes pull-down only, the signal prev is connected to the input of the present DFF, and the output of the present DFF is disconnected from the signal next. Meanwhile, the reset logic sets clr=1 to reset prev to 0. While clr=1, 1 clock signal clk period is needed to reset present to 0.

When the rising edge signal is propagating on the un-clocked skip path, it no longer follows the scan clock signal clk, the propagation time depends on the length of the skip path. In other words, it depends on how many consecutive rows/columns without information exist, which can be skipped. In the case when the rising edge signal is propagating on the un-clocked skip path for longer than 1 clock cycle or period, by the time the rising edge signal arrives at the next processing block that selects a clocked service path, there is no guarantee that the rising edge signal will follow the setup and hold time constraints of the processing block. Hence metastable condition may occur.

The origin of a metastable condition can arise from the fact that the rising edge signal violates the setup or hold time constraints of a processing block, in particular of a flip-flop, when the rising edge signal propagates from the un-clocked skip path to the clocked service path. Therefore, the origin of a metastable condition can only last for one clock clk period at most, because after one clock period, the input of the metastable flip-flop is a clean 1, i.e the rising edge has passed. Hence, it is safe to assume that any metastable condition propagated from its origin can only last for one clock period at most at any subsequent flip-flop in the clocked service path.

Figure 5:
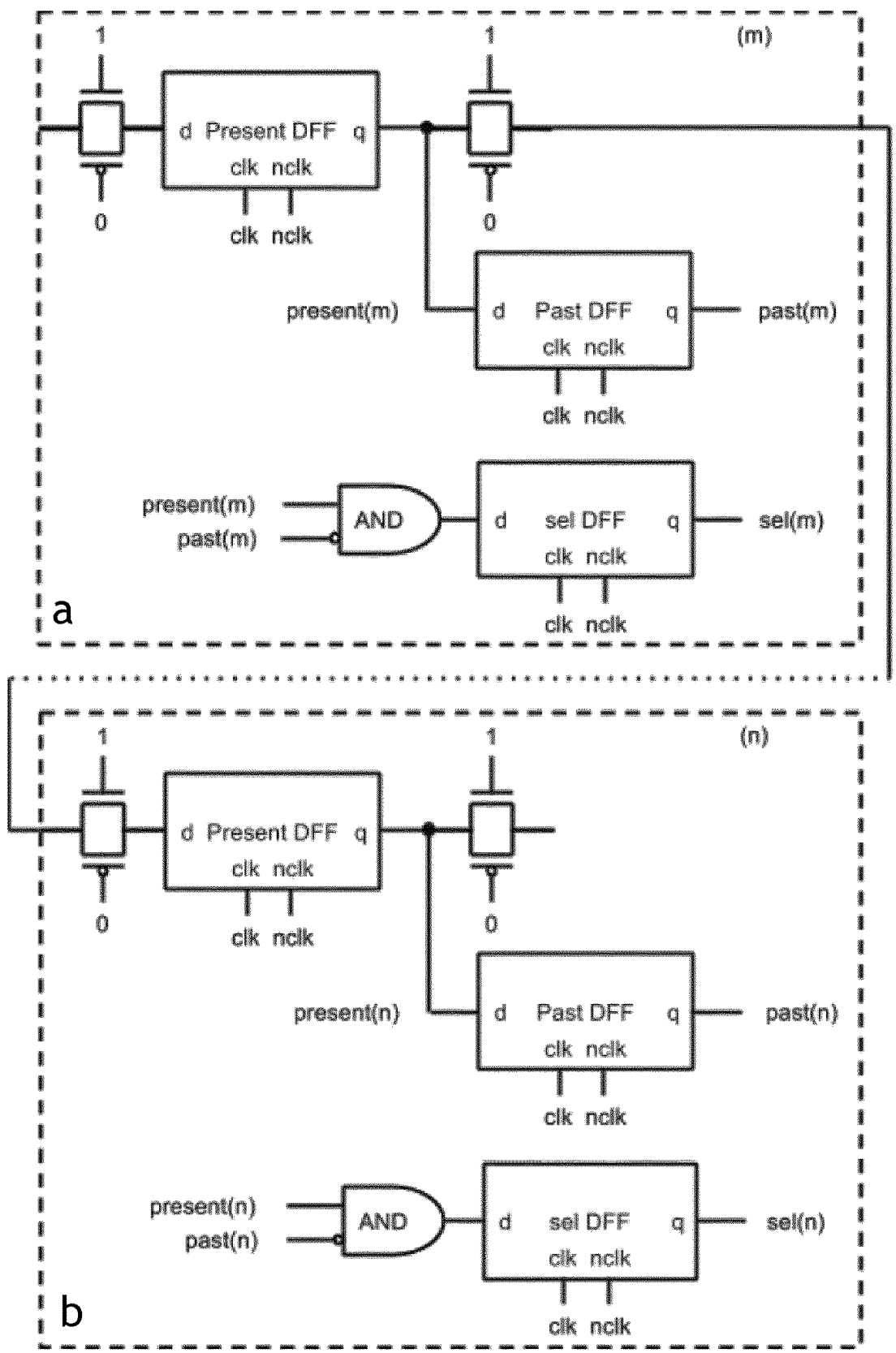
FIG. 5 shows two segments of a chain of processing blocks according to FIG. 4, in order to discuss possible metastable situations.

FIG. 5 shows the service paths and the rising edge detectors of two processing blocks, the service paths of which the authorization signal travels consecutively. These are a processing block m in the chain 1, 2 of processing blocks, shown in FIG. 5a, and a next processing block n in that chain 1, 2, shown in FIG. 5b. The connection between the processing blocks m and n is indicated with a dotted line, in order to clarify that the there could be none or several other processing blocks in between the processing blocks m and n, as along as the authorization signal only propagates through the skip paths of these several processing blocks. Based on the above assumption, there are two ways the chain 1, 2 of processing blocks could fail due to metastable conditions:

1. An omission failure occurs when a row/column that has information and hence should be serviced is instead skipped. This situation can be described as follows: At time t, the rising edge signal causes the present DFF in the processing block m to produce a metastable output $0<$present$(m)<1$. If at time t+1, the rising edge detector in the processing block m produces sel(m)=0, or $0<$sel$(m)<1$ and the past DFF in the processing block m produces past(m)=1, then at time t+2, sel(m)=0 (because at t+1, present(m)=1 and past(m)=1). Thus, the corresponding row/column that should be serviced is instead skipped or only insufficiently serviced. This scenario can be described in short as follows, where e.g. past(m) describes the output of the past DFF in processing block (m) shown in FIG. 5:
time=t: $0<$present$(m)<1$,
　past(m)=0,
　sel(m)=0
time=t+1: present(m)=1,
　past(m)=1,
　sel(m)<1
time=t+2: present(m)=1,
　past(m)=1,
　sel(m)=0

2. A collision failure occurs when more than one row/column is serviced at the same time. This situation can be described as follows: At time t, the rising edge signal causes the present DFF in the processing block m to produce a metastable output $0<$present$(m)<1$. If at time t+1, the past DFF in the processing block m produces past(m)=0, but the present DFF in the next processing block n (on the clocked service path) produces present(n)=1, then at time t+2, the rising edge detectors in the processing block m and n will set sel(m)=1 and sel(n)=1. As a result, the two corresponding rows/columns are serviced at the same time. This scenario can be described in short as follows, where e.g. past(n) describes the output of the past DFF in processing block (n) shown in FIG. 5:
time=t: 0<present(m)<t,
  past(m)=0,
  present(n)=0,
  past(n)=0,
  sel(m)=0,
  sel(n)=0
time=t+1: present(m)=1,
  past(m)=0,
  present(n)=1,
  past(n)=0,
  sel(m)=0/1,
  sel(n)=0
time=t+2: present(m)=1,
  past(m)=1,
  present(n)=1,
  past(n)=1,
  sel(m)=1,
  sel(n)=1

In order to prevent the above two failures, the processing blocks may be implemented with a switching threshold disparity technique:

1. In order to prevent omission failures, the present input to the rising edge detector may be designed to have a lower switching threshold than the input to the past DFF. When going back to the omission failure scenario described above in view of FIG. 5: At time t, the rising edge signal causes the present DFF in the processing block m to produce a metastable output 0<present(m)<1. If at time t+1, the rising edge detector in the processing block m produces sel(m)=0 or 0<sel(m)<1, then the past DFF in the processing block m must produce past(m)=0 due to its higher switching threshold. Hence, at time t+2, the rising edge detector in the processing block m will produce sel(m)=1, which guarantees that the corresponding row/column will be serviced.

2. In order to prevent collision failures, the input to the present DFF and the skip path relays 51, 52 may be designed to have a higher switching threshold than the input to the past DFF. When going back to a collision failure scenario described above in view of FIG. 5: At time t, the rising edge signal causes the present DFF in the processing block m to produce a metastable output 0<present(m)<1. If at time t+1, the past DFF in the processing block m produces past(m)=0, then the present DFF in the next processing block n (on the clocked service path) must produce present(n)=0 due to the higher switching threshold of the present DFF and the skip path relays 51, 52. In this case, at time t+2, the rising edge detector in the processing block m sets sel(m)=1, but the rising edge detector in the processing block n will set sel(n)=0, therefore only 1 row/column is serviced at the one time.

With the above two measures, the chain 1, 2 is able to function despite of experiencing metastable conditions. If a metastable condition occurs, the worst case scenario is that the rising edge takes one additional clock cycle or clock period to propagate to the next processing block on the clocked service path.

In order to implement both the measure against omission failure (present input to rising edge detector has a lower switching threshold than input to past DFF) and the measure against collision failure (input to present DFF and skip path relays have a higher switching threshold than input to the past DFF), the switching thresholds may be adjusted as follows:

Present input to the rising edge detector has a low switching threshold,
The input to the past DFF has a medium switching threshold, and
Both the input to the present DFF and the skip path relays have high switching thresholds.

Figure 6:
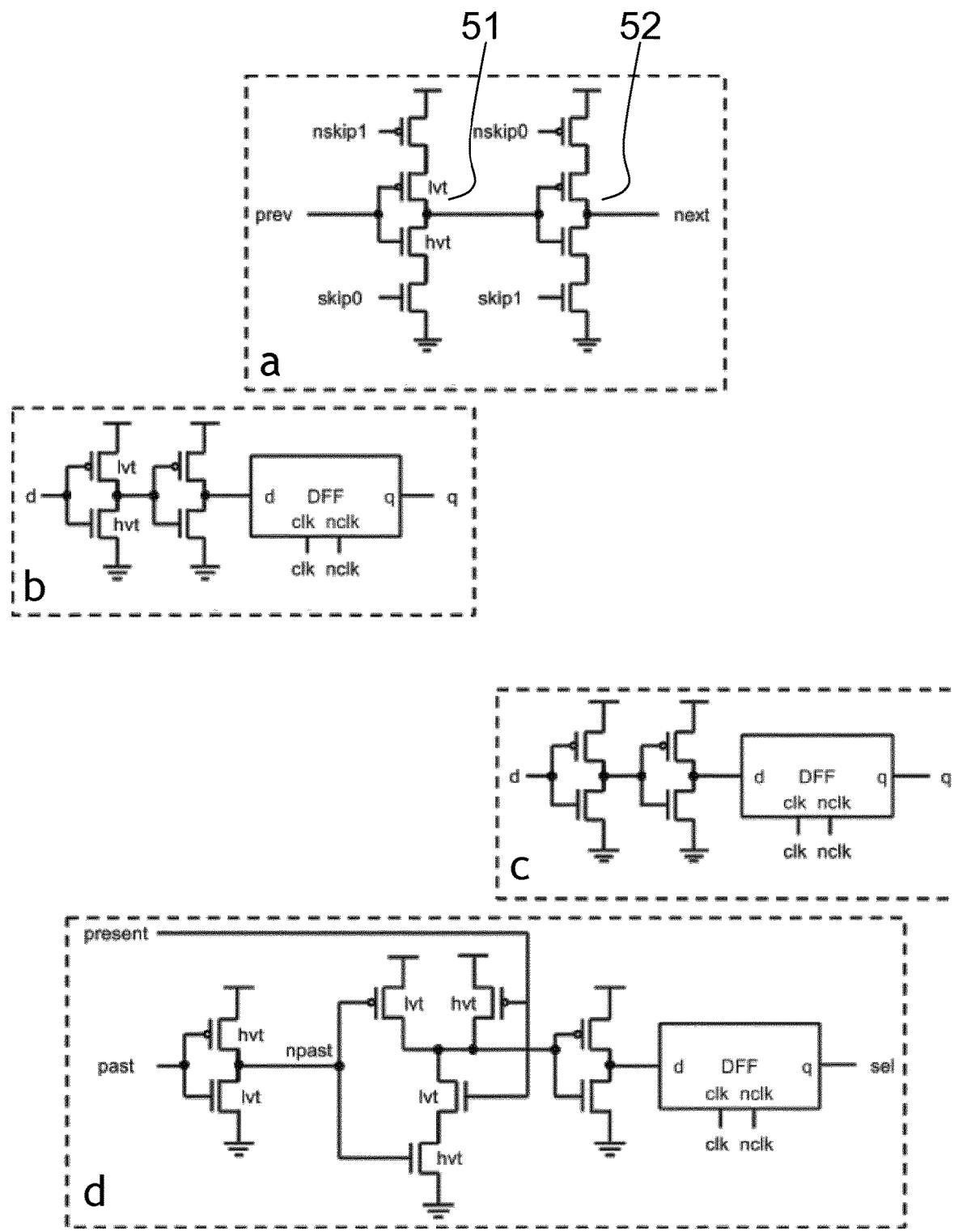
FIG. 6 shows internal details of the processing block of FIG. 3 according to an alternative embodiment, for avoiding metastable situations discussed with regard to FIG. 5.

One way of realizing this switching threshold disparity technique is shown in FIG. 6. Here, the designation "lvt" means that the corresponding transistor (FET) has a low voltage threshold and the designation "hvt" means that it has a high voltage threshold. Unlabeled transistors have standard (medium) thresholds.

FIG. 6a shows a modified skip path circuit, where the skip path relays 51, 52 have been modified in order to have a high switching threshold. For this purpose, the two complementary FETs of the first relay 51 have different voltage thresholds, the top (supply side) FET having a lower voltage threshold, while the lower (ground side) FET has a high voltage threshold.

FIG. 6b shows a present DFF with input relays, similar to the relays 51, 52 of the modified skip path circuit of FIG. 6a, in order to achieve also a high switching threshold for the input to the present DFF. FIG. 6c shows a modified circuit for the past DFF, where two relays have been added to the input of the past DFF, which do not have the voltage thresholds of their FETs mismatched. This leads to a regular switching threshold. The two relays are preferred here in order to achieve the same propagation delay for the rising edge signal through the modified past DFF circuit of FIG. 6c as through the modified present DFF circuit of FIG. 6b. The two circuits shown in FIGS. 6b and 6c have to be combined to obtain a modified processing block to replace the one shown in FIG. 4d.

Finally, FIG. 6d shows a modified rising edge detector where the complementary FET pairs have been modified in their voltage thresholds in order to obtain an overall low switching threshold for its input.

There are other options and techniques to realize the above mentioned switching threshold disparity conditions or switching threshold disparity technique. FIG. 7a shows an embodiment of a high switching threshold C2MOS DFF, which could be used for the present DFF instead of the one in FIG. 6b, while FIG. 7b shows an embodiment of a medium switching threshold C2MOS DFF, which could be used for the past DFF instead of the one in FIG. 6c.

Figure 8:
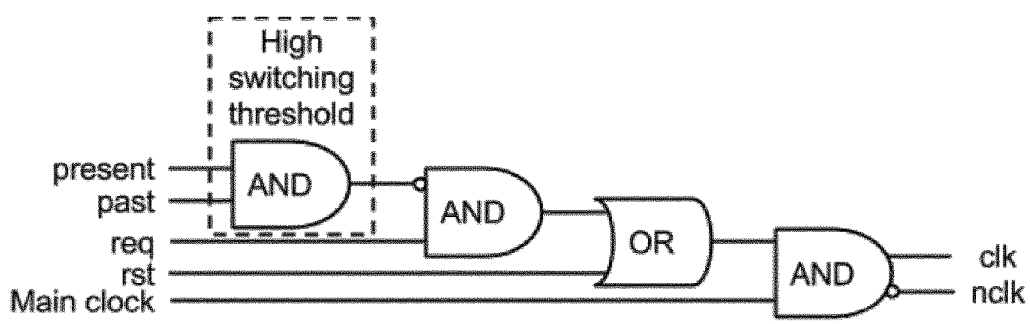
FIG. 8 shows a circuit diagram for an embodiment utilizing clock gating.

Furthermore, the clock gating can be utilized to reduce power consumption in a processing block. An example for such an embodiment is shown in FIG. 8, where the clock signal clk and the negative clock signal nclk are obtain by combining a Main clock signal generated by the host device with various signals from the processing block circuit. These signals are: A reset signal rst, a request signal req and the past and present signals discussed in connection with FIGS. 4 and 5. Combining the Main clock signal with the request signal ensures that only the processing blocks associated with information containing electronic components or sets of electronic components are clocked. Combining the Main clock signal with the reset signal ensures that all processing blocks can be reset regardless of whether they are associated with information containing electronic components or not. Combining the Main clock signal with the present and past signals ensures that when the rising edge signal has passed, the processing block is no longer clocked. This latter option is a unique advantage of having a switching edge signal instead of a pulse as the authorization signal.

The previous descriptions show embodiments of the device for controlling a transfer of information working with a rising edge signal as authorization signal. As mentioned further above, a falling edge signal can be utilized instead, i.e. a switch of value from a logical high to a logical low, instead of a switch from a logical low to a logical high. The circuits shown in FIGS. 4 to 7 would have to be modified in the following way in order for the device to work with a falling edge signal as authorization signal: In FIG. 4b, the transistor following the AND gate will have its source, previously connected to a logical low value or ground, now connected to a logic high value instead. Furthermore, the signal on the gate of that transistor is an inverted clr signal nclr. In FIG. 4c, the signal inputs for nskip0 and nskip1 are interchanged, as well as the signal inputs for skip0 and skip1. In contrast to the rising edge signal case, here when rst=1, then prev, next and present should be reset to 1. Finally, the rising edge detector in FIG. 4e is modified into a falling edge detector by inverting the present input to the AND gate instead of the past input.

With these modifications, the scenario in which an omission failure occurs can be described in short (analogous to the one described above in connection with FIG. 5) as follows:

time=t: 0<present(m)<1,
past(m)=1,
sel(m)=0
time=t+1: present(m)=0,
past(m)=0,
sel(m)<1
time=t+2: present(m)=0,
past(m)=0,
sel(m)=0

And the scenario in which a collision failure occurs can be described in short (analogous to the one described above in connection with FIG. 5) as follows:

time=t: 0<present(m)<t,
past(m)=1,
present(n)=1,
past(n)=1,
sel(m)=0,
sel(n)=0
time=t+1: present(m)=0,
past(m)=1,
present(n)=0,
past(n)=1,
sel(m)=0/1,
sel(n)=0
time=t+2: present(m)=0,
past(m)=0,
present(n)=0,
past(n)=0,
sel(m)=1,
sel(n)=1

The implementation of a switching threshold disparity in a processing block with a falling edge authorization signal can be similar to the one shown in FIG. 6, except for the following modifications: In FIGS. 6a, 6b, and 6d, the transistors (FETs) having a low voltage threshold are replaced by transistors having a high voltage threshold, and vice versa. In other words, the labels "lvt" and "hvt" are interchanged in FIGS. 6a, 6b, and 6d. Furthermore, the signal inputs present and past have also to be interchanged in order to obtain a falling edge detector in FIG. 6d.

Figure 7:
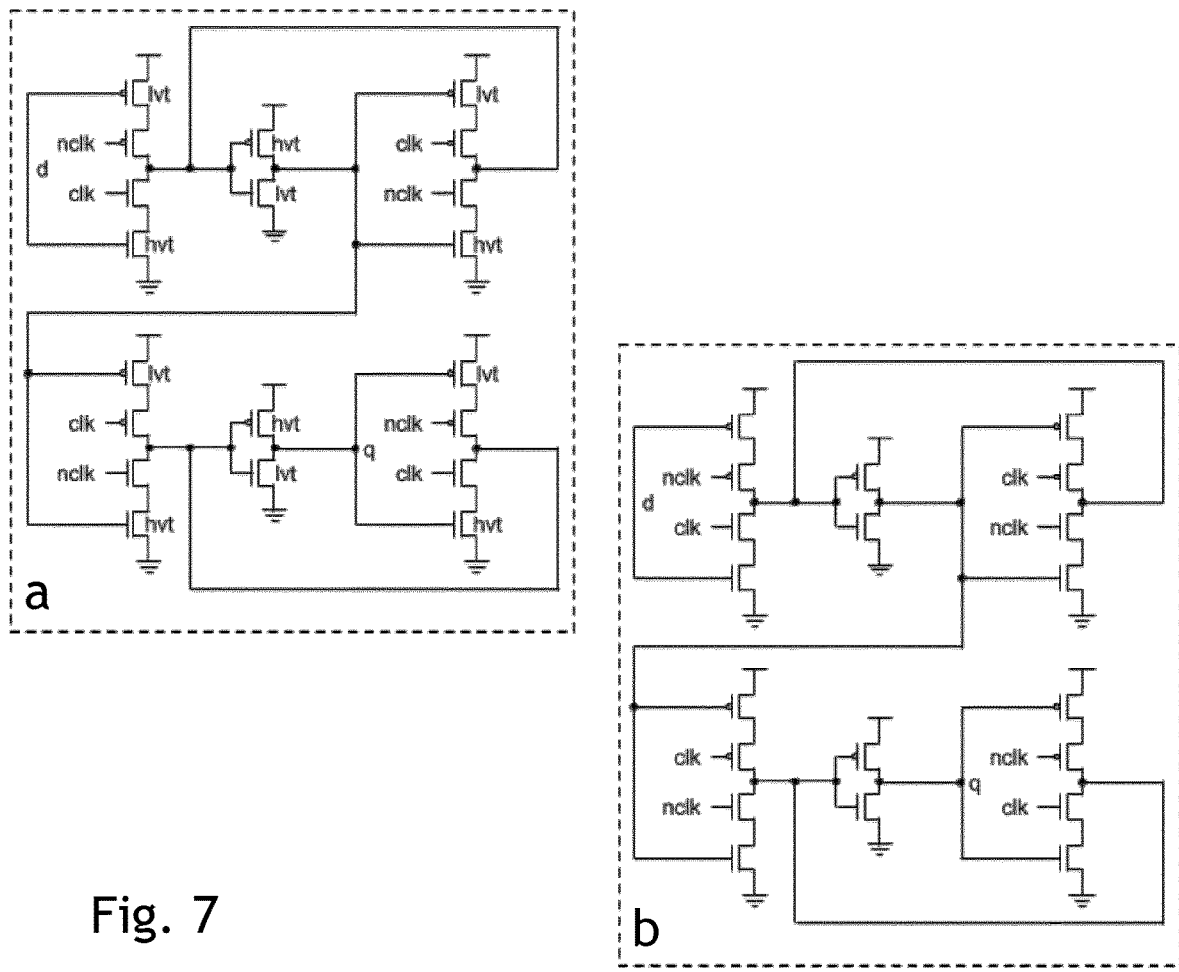
FIG. 7 shows internal details of the processing block of FIG. 3 according to yet a further alternative embodiment.

Finally, in a falling edge authorization signal situation, the alternative implementation of switching threshold disparity directly in the DFF can be realized similar to the circuits in FIG. 7, by interchanging all low voltage threshold transistors with high voltage threshold transistors and vice versa, in FIG. 7a.

REFERENCE NUMERALS 1 first chain of processing blocks
11 x encoder
2 second chain of processing blocks
21 y encoder
3 2D array of electronic components
4 communication bus
5 processing block
51 first skip path relay
52 second skip path relay

The invention claimed is:

1. A device for controlling a transfer of information from a plurality of electronic components through a communication bus to a host device, comprising a chain of processing blocks connected to the plurality of electronic components, each of the processing blocks associated with one of the plurality of electronic components or with a set of electronic components of the plurality of electronic components, which processing blocks are arranged such that during the course of the transfer of information an authorization signal propagates through the chain of processing blocks and, when the authorization signal encounters a processing block associated with one of the electronic components or one of the sets of electronic components which contains an information value to be transferred, effecting the transfer of the information value through the communication bus to the host device, wherein the processing blocks are arranged to coordinate their processing in accordance with a clock signal that is generated independent of a propagation status of the authorization signal within the chain of processing blocks, wherein each processing block comprises a service path and a skip path for the authorization signal to selectively propagate along, wherein the authorization signal propagates by way of the service path when the processing block is associated with one of the electronic components or one of the sets of electronic components, which contains an information value to be transferred, and otherwise propagates by way of the skip path, wherein the service path contains a Present flip-flop having an input and an output, a Past flip-flop having an input and an output, and a switching signal detector, which comprises a Present input connected to the output of the Present flip-flop and a Past input connected to the output of the Past flip-flop for comparing the output of the Present flip-flop and the output of the Past flip-flop, and wherein the Present input to the switching signal detector has a lower switching threshold than the input to the Past flip-flop, in order to avoid an omission failure, and/or wherein the input to the Past flip-flop has a lower switching threshold than the input to the Present flip-flop and the input to the skip path, in order to prevent a collision failure.

2. The device according to claim 1, wherein the processing blocks are arranged to coordinate their processing in accordance with a clock signal received from the host device.

3. The device according to claim 1, wherein the processing blocks are arranged such that the authorization signal is propagated through the processing block associated with one of the electronic components or one of the sets of electronic components, which contains an information value to be transferred, coordinated by the clock signal received from the host device.

4. The device according to claim 3, wherein the processing blocks are arranged such that the authorization signal is propagated through at most one processing block associated with one of the electronic components, which contains an information value to be transferred, for each clock cycle of the clock signal.

5. The device according to claim 1, wherein the authorization signal is a switching edge signal.

6. The device according to claim 1, wherein each of the processing blocks comprises one or multiple pairs of complementary transistors.

7. The device according to claim 6, wherein in at least one of the pairs of complementary transistors one of the transistors has a different threshold than the other of the transistors.

8. The device according to claim 7, wherein said at least one pair of complementary transistors comprises a low threshold transistor and/or a high threshold transistor.

9. The device according to claim 1, further comprising a first chain of processing blocks, each associated with a column of electronic components of the plurality of electronic components and a second chain of processing blocks, each associated with a row of electronic components of the plurality of electronic components, wherein the first and second chains of processing blocks are arranged such that the authorization signal is propagated through the second chain of processing blocks from the processing block associated with a row of electronic components to the processing block associated with a following row of electronic components, and for each row of electronic components, the authorization signal is propagated through the first chain of processing blocks from the processing block associated with a column of electronic components to the processing block associated with a following column of electronic components.

10. The device according to claim 1, wherein effecting the transfer of the information value through the communication bus to the host device is performed by giving access of the communication bus to the electronic component, which contains the information value, and sending an identifier of the electronic component, which contains the information value, to the host.

11. A method for controlling a transfer of information from a plurality of electronic components through a communication bus to a host device, wherein in a chain of processing blocks each of the processing blocks is associated with one of the plurality of electronic components or with a set of electronic components of the plurality of electronic components, wherein during the course of the transfer of information, an authorization signal propagates through the chain of processing blocks and, when the authorization signal encounters a processing block associated with one of the electronic components or one of the sets of electronic components which contains an information value to be transferred, the information value is transferred through the communication bus to the host device, wherein processing of the processing blocks is coordinated in accordance with a clock signal received from the host device that is generated independent of a propagation status of the authorization signal within the chain of processing blocks, wherein each processing block comprises a service path and a skip path for the authorization signal to selectively propagate along, wherein the authorization signal propagates by way of the service path when the processing block is associated with one of the electronic components or one of the sets of electronic components, which contains an information value to be transferred, and otherwise propagates by way of the skip path, wherein the service path contains a Present flip-flop having an input and an output, a Past flip-flop having an input and an output, and a switching signal detector, which comprises a Present input connected to the output of the Present flip-flop and a Past input connected to the output of the Past flip-flop, wherein the switching signal detector compares the output of the Present flip-flop and the output of the Past flip-flop, and wherein the Present input to the switching signal detector has a lower switching threshold than the input to the Past flip-flop, in order to avoid an omission failure, and/or wherein the input to the Past flip-flop has a lower switching threshold than the input to the Present flip-flop and the input to the skip path, in order to prevent a collision failure.

* * * * *